(12) United States Patent
Ahn et al.

(10) Patent No.: US 7,376,155 B2
(45) Date of Patent: May 20, 2008

(54) METHOD AND APPARATUS FOR DELIVERY OF METADATA SYNCHRONIZED TO MULTIMEDIA CONTENTS

(75) Inventors: Sang-Woo Ahn, Daejeon (KR); Mun-Churl Kim, Daejeon (KR); Yong-Suk Kim, Seoul (KR); Jin-Soo Choi, Daejeon (KR); Jin-Woong Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 883 days.

(21) Appl. No.: 10/470,755

(22) PCT Filed: Jan. 30, 2002

(86) PCT No.: PCT/KR02/00137

§ 371 (c)(1),
(2), (4) Date: Dec. 4, 2003

(87) PCT Pub. No.: WO02/061596

PCT Pub. Date: Aug. 8, 2002

(65) Prior Publication Data

US 2004/0098398 A1 May 20, 2004

(30) Foreign Application Priority Data

Jan. 30, 2001 (KR) .................... 2001-4341

(51) Int. Cl.
*H04J 3/06* (2006.01)
*H04N 7/08* (2006.01)

(52) U.S. Cl. .............. 370/503; 370/522; 370/535; 370/537

(58) Field of Classification Search ............... 370/498, 370/503, 522, 535, 537, 474, 475, 476; 707/100, 707/101, 104
See application file for complete search history.

(56) References Cited

U.S. PATENT DOCUMENTS 5,721,911 A 2/1998 Ha et al.

(Continued)

FOREIGN PATENT DOCUMENTS

KR 1020010092899 10/2001

OTHER PUBLICATIONS

"A Design of a Streaming System for Interactive Television Broadcast" by Jin-Young Yang, et al.; *IEEE International Symposium on Circuits and Systems*, May 28-31, 2000; Geneva, Switzerland; pp. 559-562.

(Continued)

*Primary Examiner*—Min Jung
(74) *Attorney, Agent, or Firm*—Blakely, Sokoloff, Taylor & Zafman

(57) ABSTRACT

A metadata transmitter synchronized with multimedia contents comprises: a multimedia contents authoring unit for generating and editing multimedia contents; a multimedia contents format converter for compressing the multimedia contents, converting them into a transmission format, and outputting them; a metadata authoring unit for generating and editing metadata for describing the multimedia contents, the metadata including transmission types and transmission information; a metadata format converter for converting the metadata into binary codes, converting the converted metadata into a synchronization format for synchronization with the multimedia contents and a transmission format, and outputting them; and a multiplexer for multiplexing the multimedia contents format and the metadata format respectively output from the multimedia contents format converter and the metadata format converter into a stream, and outputting it.

18 Claims, 5 Drawing Sheets

U.S. PATENT DOCUMENTS

| | | | |
|---|---|---|---|
| 6,055,543 A | 4/2000 | Christensen et al. | |
| 6,505,169 B1* | 1/2003 | Bhagavath et al. | 705/14 |
| 6,642,967 B1* | 11/2003 | Saunders | 348/714 |
| 6,937,706 B2* | 8/2005 | Bscheider et al. | 379/88.22 |
| 6,963,972 B1* | 11/2005 | Chang et al. | 713/153 |
| 2001/0042114 A1* | 11/2001 | Agraharam et al. | 709/223 |
| 2004/0071445 A1* | 4/2004 | Tarnoff et al. | 386/96 |

OTHER PUBLICATIONS

"Delivery of MPEG-7 descrpition data over MPEG-2 Transport System Systems" by Sang Woo Ahn, et al.; International Organisation for Standardisation; ISO/IEC JTC1/SC29/WG11; Coding of Moving Pictures and Audio; Oct. 2000.

"Interactive Broadcast Terminal System Using MPEG-2 and MPEG-4" by Yongsuk Kim, et al.; *IEEE International Symposium on Circuits and Systems*, May 28-31, 2000; Geneva, Switzerland; pp. 682-685.

* cited by examiner

FIG.4

| stream_id | Note | Stream coding |
|---|---|---|
| 1011 1100 | 1 | program_stream_map |
| 1011 1101 | 2 | private_stream_1 |
| 1011 1110 | | padding_stream |
| 1011 1111 | 3 | private_stream_2 |
| 110x xxxx | | ISO/IEC 13818-3 or ISO/IEC 11172-3 or ISO/IEC 13818-7 or ISO/IEC 14496-3 audio stream number x xxxx |
| 1110 xxxx | | ITU-T Rec. H.262 | ISO/IEC 13818-2 or ISO/IEC 11172-2 or ISO/IEC 14496-2 video stream number xxxx |
| 1111 0000 | 3 | ECM_stream |
| 1111 0001 | 3 | EMM_stream |
| 1111 0010 | 5 | ITU-T Rec. H.222.0 | ISO/IEC 13818-1 Annex A or ISO/IEC 13818-6_DSMCC_stream |
| 1111 0011 | 2 | ISO/IEC_13522_stream |
| 1111 0100 | 6 | ITU-T Rec. H.222.1 type A |
| 1111 0101 | 6 | ITU-T Rec. H.222.1 type B |
| 1111 0110 | 6 | ITU-T Rec. H.222.1 type C |
| 1111 0111 | 6 | ITU-T Rec. H.222.1 type D |
| 1111 1000 | 6 | ITU-T Rec. H.222.1 type E |
| 1111 1001 | 7 | ancillary_stream |
| 1111 1010 | | ISO/IEC14496-1_SL-packetized_stream |
| 1111 1011 | | ISO/IEC14496-1_FlexMux_stream |
| 1111 1100 | | Metadata stream |
| 1111 1101 □ 1111 1110 | | reserved data stream |
| 1111 1111 | 4 | program_stream_directory |

The notation x means that the values '0' or '1' are both permitted and results in the same stream type. The stream number is given by the values taken by the x means

NOTES

1  PES packets of type program_stream_map have unique syntax specified in 2.5.4.1.

2  PES packets of type private_stream_1 and ISO/IEC_13552_stream follow the same PES packet syntax as those for ITU-T Rec. H.262 ISO/IEC 13818-2 video and ISO/IEC 13818-3 audio streams.

3  PES packets of type private_stream_2, ECM_stream and EMM_stream are similar to private_stream_1 except no syntax is specified after PES_packet_length field.

4  PES packets of type program_stream_directory have a unique syntax specified in 2.5.5.

5  PES packets of type DSM-CC_stream have a unique syntax specified in ISO/IEC 13818- 6.

6  This stream_id is associated with stream_type 0x09 in Table 2-29.

7  This stream_id is only used in PES packets, which carry data from a Program Stream or an ISO/IEC 11172-1 System Stream, in a Transport Stream (refer to 2.4.3.7).

FIG.5

| Value | Description |
|---|---|
| 0x00 | ITU-T | ISO/IEC Reserved |
| 0x01 | ISO/IEC 11172 Video |
| 0x02 | ITU-T Rec. H.262 | ISO/IEC 13818-2 Video or ISO/IEC 11172-2 constrained parameter video stream |
| 0x03 | ISO/IEC 11172 Audio |
| 0x04 | ISO/IEC 13818-3 Audio |
| 0x05 | ITU-T Rec. H.222.0 | ISO/IEC 13818-1 private sections |
| 0x06 | ITU-T Rec. H.222.0 | ISO/IEC 13818-1 PES packets containing private data |
| 0x07 | ISO/IEC 13522 MHEG |
| 0x08 | ITU-T Rec. H.222.0 | ISO/IEC 13818-1 Annex A DSM CC |
| 0x09 | ITU-T Rec. H.222.1 |
| 0x0A | ISO/IEC 13818-6 type A |
| 0x0B | ISO/IEC 13818-6 type B |
| 0x0C | ISO/IEC 13818-6 type C |
| 0x0D | ISO/IEC 13818-6 type D |
| 0x0E | ITU-T Rec. H.222.0 | ISO/IEC 13818-1 auxiliary |
| 0x0F | ISO/IEC 13818-7 Audio with ADTS transport syntax |
| 0x10 | ISO/IEC 14496-2 Visual |
| 0x11 | ISO/IEC 14496-3 Audio with the LATM transport syntax as defined in ISO/IEC 14496-3 / AMD 1 |
| 0x12 | ISO/IEC 14496-1 SL-packetized stream or FlexMux stream carried in PES packets |
| 0x13 | ISO/IEC 14496-1 SL-packetized stream or FlexMux stream carried in ISO/IEC14496 sections. |
| 0x14 | ISO/IEC 13818-6 Synchronized Download Protocol |
| 0x15 | Metadata stream carried in PES packets |
| 0x16 | Metadata stream carried in Private Section |
| 0x17-0x7F | ITU-T Rec. H.222.0 | ISO/IEC 13818-1 Reserved |
| 0x80-0xFF | User Private |

US 7,376,155 B2

METHOD AND APPARATUS FOR DELIVERY OF METADATA SYNCHRONIZED TO MULTIMEDIA CONTENTS

The present patent application is a non-provisional application of International Application No. PCT/KR02/00137, filed Jan. 30, 2002.

CROSS REFERENCE TO RELATED APPLICATION

This application is based on Korea Patent Application No. 2001-4341 filed on Jan. 30, 2001 in the Korean Intellectual Property Office, the content of which is incorporated herein by reference.

BACKGROUND OF THE INVENTION (a) Field of the Invention

The present invention relates to an apparatus and method for synchronizing metadata with multimedia contents, and transmitting them.

(b) Description of the Related Art

Metadata description methods for representing Essence, which is multimedia contents, and their standardization activities are now in progress. However, prior art only disclose metadata description methods and do not include synchronization and transmission methods of the multimedia contents and related metadata. The specifications of the metadata description method are found from MPEG, SMPTE, and TV.Anytime.

SUMMARY OF THE INVENTION

It is an object of the present invention to provide a method for synchronizing metadata with multimedia contents, and transmitting them, and for a terminal to receive the multimedia contents including the metadata and use them.

In one aspect of the present invention, a metadata transmitter synchronized with multimedia contents comprises: a multimedia contents authoring unit for generating and editing multimedia contents; a multimedia contents format converter for compressing the multimedia contents, converting them into a transmission format for synchronization and transmission, and outputting them; a metadata authoring unit for generating and editing metadata for describing the multimedia contents, the metadata including transmission types and transmission information; a metadata format converter for converting the metadata into binary codes, converting the converted metadata into a synchronization format for synchronization with the multimedia contents and a transmission format for transmission, and outputting them; and a multiplexer for multiplexing the multimedia contents format and the metadata format respectively output from the multimedia contents format converter and the metadata format converter into a stream, and outputting it.

The metadata format converter comprises: a metadata synchronization format converter for converting the metadata transmitted from the metadata authoring unit into binary codes, and converting them into a synchronization format for synchronization with the multimedia contents; and a metadata transmission format converter for converting the data output from the metadata synchronization format converter, according to a transmission format.

In another aspect of the present invention, a method for synchronizing metadata with multimedia contents and transmitting them comprises: (a) generating and editing metadata for describing multimedia contents, the metadata including transmission types and transmission information; (b) converting the metadata into binary codes, and converting the converted metadata into a synchronization format for synchronization with the multimedia data; and (c) converting the metadata converted in (b) into a transmission format for transmission.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4 shows definitions of stream identifiers used for transmitting the metadata synchronized with MPEG-2 data according to a preferred embodiment of the present invention;

FIG. 5 shows definitions of stream-type values used for transmitting the metadata synchronized with MPEG-2 data according to a preferred embodiment of the present invention;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized the invention is capable of modification in various obvious respects, all without departing from the invention. Accordingly, the drawings and description are to be regarded as illustrative in nature, and not restrictive.

Figure 1:
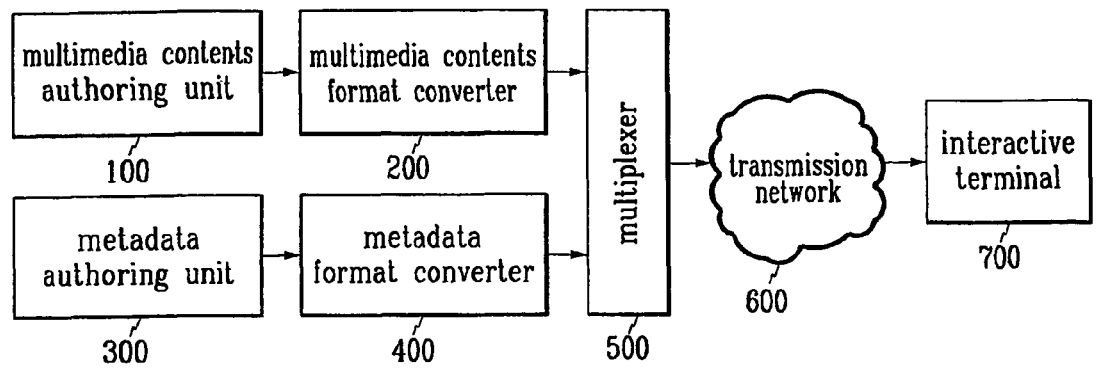
FIG. 1 shows a metadata transmission system according to a preferred embodiment of the present invention.

FIG. 1 shows a metadata transmission system according to a preferred embodiment of the present invention. As shown, the metadata transmission system comprises a multimedia contents authoring unit 100; a multimedia contents format converter 200; a metadata authoring unit 300; a metadata format converter 400; and a multiplexer 500.

The multimedia contents authoring unit 100 generates multimedia contents, edits them, and outputs them to the multimedia contents format converter 200. In this instance, the multimedia authoring process includes processes of generating and editing the multimedia data, and the editing process does not specify a particular process excepting auxiliary tasks including correcting and adding generated multimedia data.

The multimedia contents format converter 200 compresses the multimedia contents input from the multimedia contents authoring unit 100, converts them into transmission format data for synchronization and transmission, and outputs them to the multiplexer 500. The multimedia contents format converter 200 performs synchronization format conversion and transmission format conversion. According to the embodiment of the present invention, the synchronization format includes: MPEG-2 PES (packetized elementary stream) packets, MPEG-4 SL (sync layer) packets, MPEG-4 FlexMux packets, and RTP (real time protocol) standard specifications, and the transmission format includes: MPEG-2 TS (transport stream), IP (Internet protocol), and ATM (asynchronous transfer mode) standard specifications.

That is, the multimedia contents format converter 200 compresses the multimedia contents using at least one method of standard specifications of MPEG-1, MPEG-2, MPEG-4, H.261, H.263, and H.26L. In other words, for example, it compresses some of the multimedia data using the MPEG-4 standard and compresses a remaining portion of the multimedia data using the H.263 standard, so the whole of the multimedia data may comprise the MPEG-4 data and the H.263 data.

After the compression process, the multimedia contents format converter 200 converts the compressed multimedia contents into a synchronization format using at least one standard specification of the MPEG-2 PES packet, the MPEG-4 SL packet, the MPEG-4 FlexMux packet, and the RTP packet, and converts them into a transmission format using at least one standard specification of the MPEG-2 TS, the IP, and the ATM.

The metadata authoring unit 300 generates and edits metadata for describing the multimedia contents, and outputs them to the metadata format converter 400. According to the embodiment of the present invention, the metadata authoring unit 300 performs an authoring process using one of MPEG-7, SMPTE (Society of Motion Picture and Television Engineers), TV Anytime, and EBU (European broadcasting union) standard specifications on the XML (extensible markup language). In this instance, the metadata authoring unit 300 concurrently generates transmission types and transmission information at the time of authoring.

The metadata format converter 400 converts the metadata input from the multimedia contents authoring unit 100 into binary codes, converts them into a transmission format for synchronization and transmission, and outputs them to the multiplexer 500. The metadata format converter 400 performs synchronization format conversion and transmission format conversion. The synchronization format includes data characteristics, relations with whole streams, time information, and length information of a charged load, and the transmission format representing a format needed for transmitting packetized data includes sequence information and data types of the charged load.

That is, the metadata format converter 400 converts the metadata into binary codes using at least one of the MPEG-7, the SMPTE, the TV-Anytime, and the EBU standard specifications, converts the converted metadata into a synchronization format using at least one of the MPEG-2 PES packet, the MPEG-4 SL packet, the MPEG-4 FlexMux packet, and the RTP packet standard specifications, and converts them into a transmission format using at least one of the MPEG-2 TS, the IP, and the ATM standard specifications.

The multiplexer 500 multiplexes the multimedia contents input from the multimedia contents format converter 200 and the metadata input from the metadata format converter 400 into a single stream, and transmits it to a transmission network 600.

An interactive terminal 700 processes the stream transmitted via the transmission network 600 so that a user may use desired multimedia contents and metadata.

Figure 2:
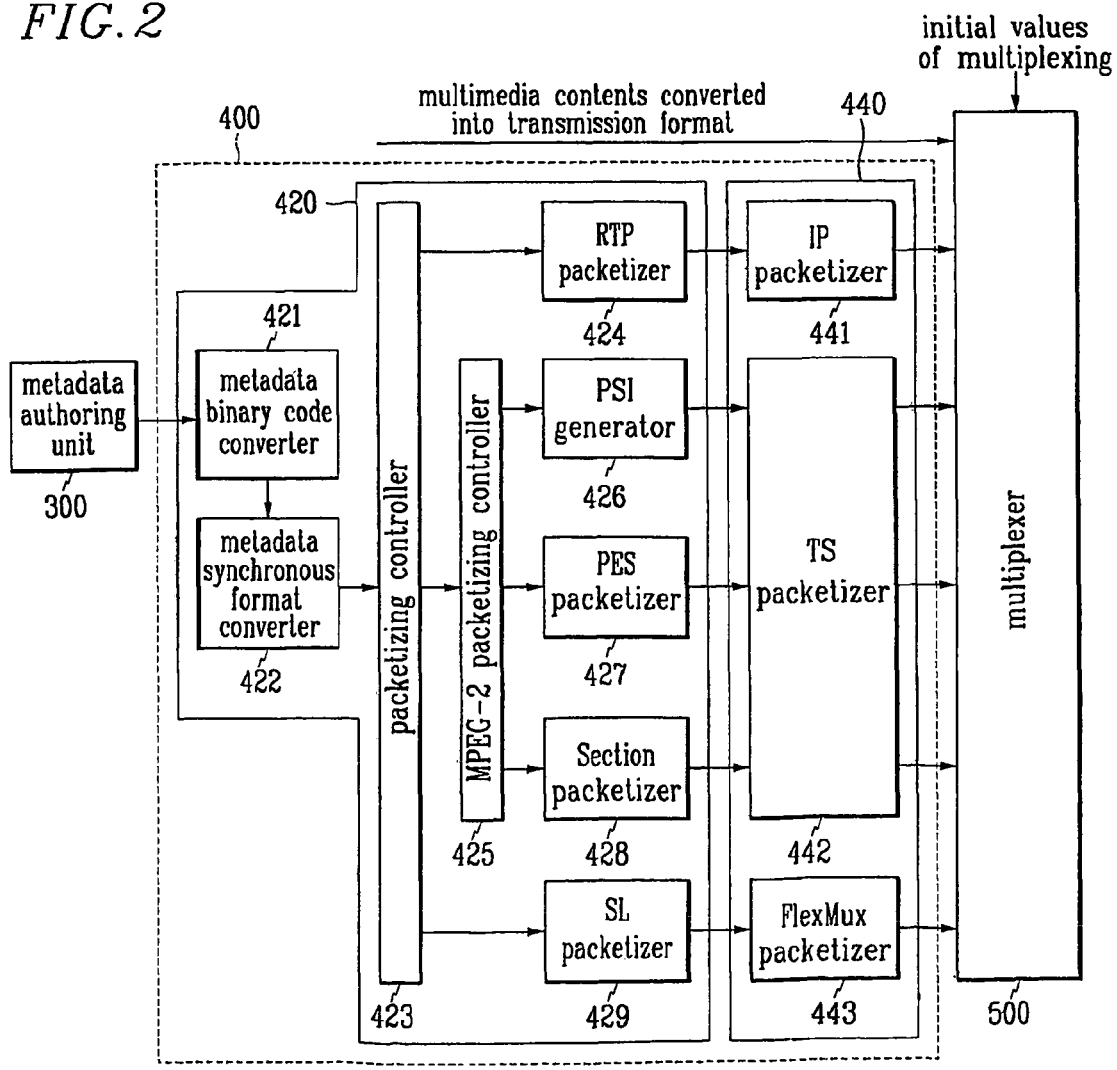
FIG. 2 shows a metadata format converter according to a preferred embodiment of the present invention.

FIG. 2 shows the metadata format converter 400 according to a preferred embodiment of the present invention. As shown, the metadata format converter 400 comprises: a metadata synchronization format converter 420; and a metadata transmission format converter 440.

The metadata synchronization format converter 420 converts the XML-language metadata transmitted from the metadata authoring unit 300 into binary codes, and converts them into a synchronization format. The metadata transmission format converter 440 converts the data transmitted from the metadata synchronization format converter 420 into predetermined data according to respective transmission formats, and outputs them to the multiplexer 500.

In this instance, the subsequent two methods can be used to synchronize the metadata according to the preferred embodiment of the present invention.

The first method is to packetize the metadata into packets identical with those for transmitting speech and image data. In detail, the metadata are packetized in the sequential order of the RTP packet and the IP packet in the Internet network case, they are packetized into TS packets after PES or section packetizing in the broadcasting network case, and they are sequentially packetized in the order of the SL packet and the FlexMux packet in the MPEG-4 case. In this instance, since the RTP packet, the PES packet, or the SL packet for packetizing the metadata has decoding time or output time value, it is required to packetize the metadata according to the time value. However, the first method is required to support each network's decoder model according to categories of transmitting networks. That is, since it is needed for the decoder to analyze the packets that have respective networks' time values and to connect to a decoder for decoding the metadata, it is impossible to amend to each system decoder model.

The second method is to convert the metadata into a synchronization format and synchronize it with multimedia data. This method enables to synchronize data and transmit them with no relation to the transmission networks. In this instance, it is necessary for the decoder model to use the decoder model of the metadata without using that of each transmission network. Also, since the metadata synchronization format has independent decoding time and output time values, it enables to operate the decoder model and support synchronization. In this instance, the decoding time value and the output time value refer to the metadata's time default value and time reference value to represent the metadata's decoding time and output time.

The metadata synchronization format converter 420 comprises: a metadata binary code converter 421; a metadata synchronous format converter 422; a packetizing controller 423; an RTP packetizer 424; an MPEG-2 packetizing controller 425; a PSI (program specific information) generator 426; a PES packetizer 427; a section packetizer 428; and an SL packetizer 429.

The metadata binary code converter 421 converts the metadata stored in the XML language into binary codes so as to transmit the metadata generated from the metadata authoring unit 300. The metadata synchronous format converter 422 converts the binary codes into a metadata synchronization format so as to synchronize and transmit them with no relation to the transmission networks. In this instance, the metadata synchronization format independently has decoding time and output time values so as to operate the decoder model and support synchronization. Also, the decoding time value and the output time value refer to the metadata's time default value and time reference value to represent the metadata's decoding time and output time.

The packetizing controller 423 selects a metadata's transmission network so as to make the transmission network of the multimedia contents coincide with that of the metadata.

The RTP packetizer 424 packetizes the metadata into an RTP, and the SL packetizer 429 packetizes synchronous, synchronized, and asynchronous metadata into an MPEG-4 SL packet.

In this instance, the technical terms "synchronous" and "synchronize" are generally used in data broadcasting. To synchronize is to match an image frame with an audio frame at a time axis so as to regulate syncs of images and speech, or to match an axis of additional data with a time axis that matches the speech with the images. To be synchronous is to match additional data with another independently-operating time axis that does not correspond to the time axis for synchronizing the speech or images.

The MPEG-2 packetizing controller 425 classifies the metadata input to be packetized into an MPEG-2 system specification, as the metadata that have synchronization time values and other metadata that do not have them, outputs the metadata that have synchronization time values to the PES packetizer 427, outputs the metadata that do not have synchronization time values to the section packetizer 428, and transmits PSI information including metadata transmission types and transmission information to the PSI generator 426.

In this instance, the PSI for representing information defined for a decoder to decode programs includes: a PAT (program association table); a PMT (program map table); an NIT (network information table); and a CAT (conditional access table). The PAT and the PMT represent information on program elements that form a program, the NIT shows information on the transmission networks, the CAT indicates information on conditional receiving, and the. PES represents a data structure used for carrying elementary streams.

Since the metadata are transmitted in the PES or sections, the PSI generator 426 receives a transmission type and transmission information and records them on the PMT section so as to provide related terminal information.

The PES packetizer 427 packetizes the synchronous and synchronized metadata into an MPEG-2 PES. Since a PES packet header includes a DTS (decoding time stamp) and a PTS (presentation time stamp), synchronization is possible based on them.

The section packetizer 428 packetizes asynchronous metadata into sections. Since a section header does not include synchronous and synchronized time values, it is used for transmitting asynchronous metadata.

The metadata transmission format converter 440 comprises: an IP packetizer 441; a TS packetizer 442; and a FlexMux packetizer 443. The IP packetizer 441 packetizes the metadata into an IP, and the FlexMux packetizer 443 packetizes the metadata into a FlexMux.

In this instance, the FlexMux represents a multiplexing method of options provided by the MPEG-4 system. That is, the FlexMux packet is used for reducing an overhead of a transmission multiplexer (TranMux) or allocating a channel of the transmission multiplexer when multiplexing a plurality of streams. In general, the MPEG-4 stream is to be packetized into an SL packet in a sync layer, but the overhead can be reduced by packetizing one or a plurality of SL packets into a single FlexMux packet. Also, each MPEG-4 stream together with a logical channel is to be transmitted to a terminal from a server, and the FlexMux packet allocates logical channels for the respective MPEG-4 streams.

The TS packetizer 442 packetizes a PMT table input from the PSI generator 426, metadata input from the PES packetizer 427, and metadata input from the section packetizer 428 into transport streams (TS).

A method for using MPEG-2 data as multimedia contents, synchronizing the metadata with the multimedia contents, and transmitting them in a digital broadcasting will now be described.

Figure 3:
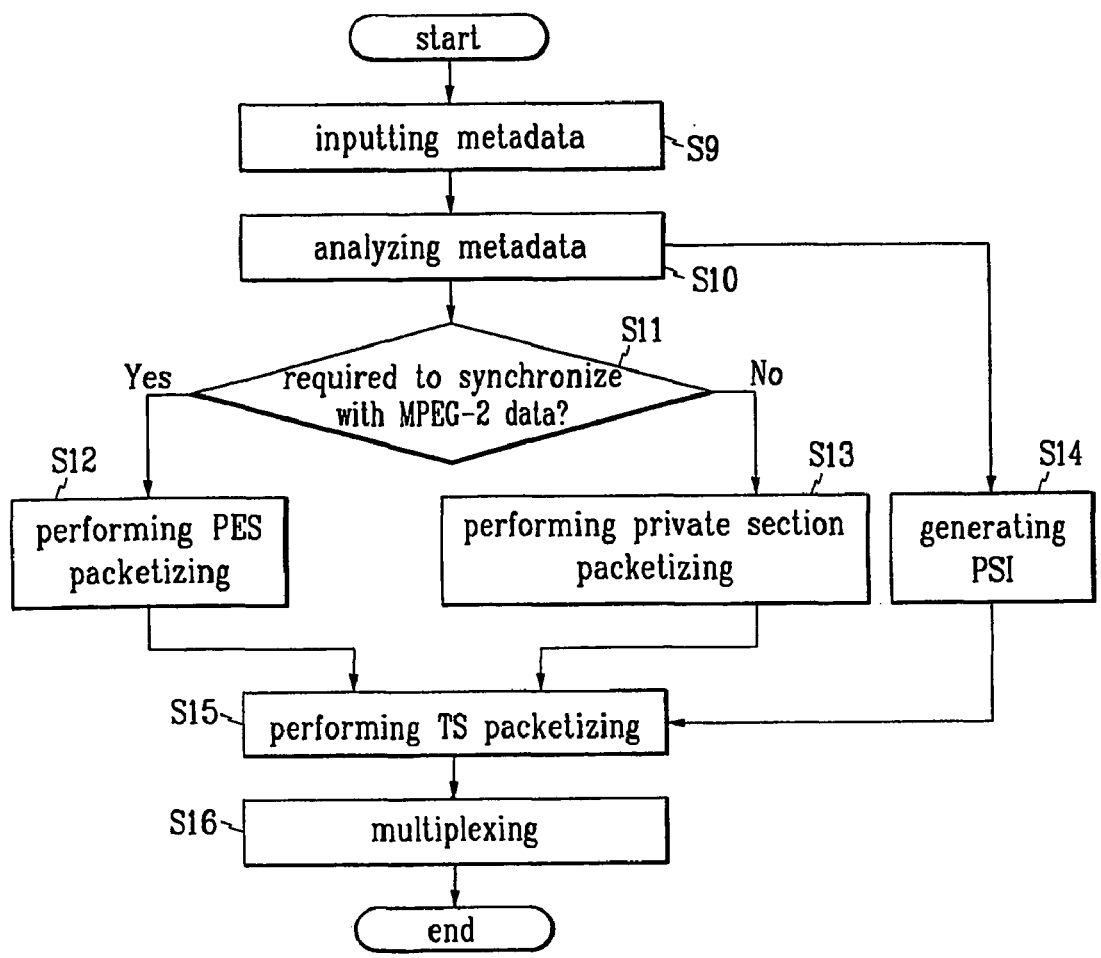
FIG. 3 shows a flowchart of a method for transmitting metadata synchronized with MPEG-2 data according to a preferred embodiment of the present invention.

FIG. 3 shows a flowchart of a method for synchronizing the metadata with the MPEG-2 data and transmitting them according to a preferred embodiment of the present invention.

When metadata are input from the metadata authoring unit 300 and the metadata binary code converter 421 in step S9, the input metadata are analyzed in step S10. In this instance, it is determined whether they need to be synchronized with the MPEG-2 data in step S11, and when needed, they are packetized into PES packets in step S12, and when not needed, they are packetized into private sections in step S13. Also, the metadata are analyzed to generate PSI in step S14, and the generated PSI, the PES, or the data packetized into private sections are packetized into TS packets in step S15. The TS-packetized metadata are multiplexed with MPEG-2 audio/video TS through an input of a synchronization initial value to be output as a single TS in step S16. In a detailed method for synchronizing the metadata with the MPEG-2 data, a metadata time default value and a metadata time reference value are defined and used so as to synchronize the metadata with a system time reference value, that is, an STC (system time clock), and a program time reference value, that is, a PCR (program clock reference) defined by the MPEG-2 system standard.

Since the STC defined by the MPEG-2 system standard is an STC operating at 27 MHz, the STC is to be cooperated with the metadata time default value as a basic condition for synchronizing the metadata with the MPEG-2 data, which is expressed in Equation 1.

$$f_{STC}(t)/f_{MetadataTimeBase}(t) = +\text{Integer} \qquad \text{Equation 1}$$

where $f_{STC}(t)$ represents a system clock signal of 27 MHz, and $f_{MetadataTimeBase}(t)$ indicates a metadata time default value.

Further, since the PCR defined by the MPEG-2 system standard is a PCR sampled by 90 KHz, the metadata time reference value is divided by the integer of 90 KHz so as to synchronize the metadata with the PCR, which is expressed in Equation 2.

$$(f_{STC}(t)/300)/f_{MetadataClockReference} = +\text{Integer} \qquad \text{Equation 2}$$

where $(f_{STC}(t)/300)$ represents 90 KHz, and $f_{MetadataClockReference}$ indicates a metadata time reference value.

For further detailed description of Equations 1 and 2, in the MPEG-2 system, the system clock signals are to be timed at 27 MHz so as to match the operation of the encoder and the decoder. For this purpose, the operation of the encoder at 27 MHz is to be provided to the decoder, which is enabled by transmitting the PCR that are values sampled at 90 KHz. The reason for transmitting the values sampled at 27 MHz/300=90 KHz is to maintain the compatibility between the MPEG-1 and the MPEG-2, since the MPEG-1 operates at 90 KHz. In this instance, Equation 1 represents that since the system clock of multimedia data operates at 27 MHz, the clock of the metadata is to operate at a clock signal divided by an integer corresponding to this, thereby enabling synchronization between them. In the like manner, Equation 2 shows that a metadata time reference value is to have a time reference value, with respect to the multimedia data transmitting a time reference value sampled by 90 KHz, as many as the number obtained by dividing 90 KHz by an integer so as thus to enable synchronization between them.

In the preferred embodiment of the present invention, in order to synchronize the metadata that require synchronization with the MPEG-2 data and transmit them, the metadata are packetized into access units using the MPEG-2 system standard. That is, to synchronize the metadata with the MPEG-2 data, the metadata are packetized into packets using the PES packets as defined by the MPEG-2 system standard, and they are transmitted using the TS. In order to packetize the metadata into PFS packets through a detailed implementation method for synchronizing the metadata with the MPEG-2 data, a stream identifier (stream_id) of a PES packet header defined by the MPEG-2 system standard is extended as follows.

The stream identifier (stream_id) of the PES packet for transmitting the metadata is a field that represents what category of data the charged load of the PES packet is. Stream identifier values for the metadata are not defined in the current international standard, but the present embodiment defines a stream_id for the metadata and uses it, and accordingly, the metadata may be carried on the charged load of the PES packet to be transmitted, which can be expressed as follows.

```
PES_packet( ) {
    Packet_start_code_prefix
    Stream_id = Metadata stream
    PES_packet_length
    ... ...}
```

In this instance, a value 0xFC is allocated as a stream identifier for a newly defined metadata stream as shown in FIG. 4.

Also, in the preferred embodiment of the present invention, in order to transmit the metadata that do not require synchronization, the metadata are packetized using the MPEG-2 system standard. In order to transmit the metadata without synchronizing them, the metadata are packetized using the private sections, and they are transmitted using the TS as defined by the MPEG-2 system standard.

In the preferred embodiment of the present invention, in order to transmit the metadata and apply them to a terminal, a message that the metadata are transmitted is reported to the terminal by using the MPEG-2 system standard. That is, in order to report a metadata transmission notice to the terminal using the MPEG-2 system, a stream type of a PMT table header defined by the MPEG-2 system standard is extended as follows.

```
TS_program_map_section ( ) {
    table_id
    section_syntax_indicator
    '0'
    ...
        // Video
        stream_type = 0x03 (ISO/IEC 13818-2 Video)
        reserved
        elementary_PID
        // Audio
        stream_type = 0x04 (ISO/IEC 13818-3 Audio)
```

-continued

```
        reserved
        elementary_PID
        ...
        ...
        // Metadata
        stream_type = 0x15 (Metadata stream carried in PES packets)
        reserved
        elementary_PID
        stream_type = 0x16 (Metadata stream carried in
Private Section)
        reserved
        elementary_PID
        ...
    }
    CRC_32
}
```

As described above, the PMT represents information on the element bit streams configuring a program, defines identifiers of respective element bit streams, and adds descriptors to show information on detailed element bit streams. However, since the current standard does not have stream_type values for the metadata in the PMT table in a similar manner as definition of stream_id, a stream_type value is to be set so as to configure the metadata into data related to a single program. Hence, the present invention defines and uses the stream_type value to synchronize the multimedia data with the metadata and transmit them.

As shown in FIG. 5, the stream-type values for the newly defined metadata stream have a value of 0x15 in the case of the metadata transmitted to the PES packet, and a value of 0x16 in the case of the metadata transmitted to the private section.

Finally, in the preferred embodiment of the present invention, in order to synchronize the metadata that require synchronization with the MPEG-2 data and transmit them, a CTS (composition time stamp)/DTS (decoding time stamp) time value of a metadata access unit is used as an input of a PTS (presentation time stamp)/DTS time value when packetizing the metadata into PES packets.

The metadata for being synchronized with the MPEG-2 data are classified in two ways. The first is as synchronous metadata, and the second is as synchronized metadata. Since the synchronous metadata stream is organically operated, the synchronous metadata can be synchronized with the multimedia contents by adding a synchronization initial value (Offset) to each CTS time value of the metadata stream to generate a PTS value, which is expressed in Equation 3.

$$PTS(t)=CTS(t)+\text{"Offset"} \qquad \text{Equation 3}$$

Figure 6:
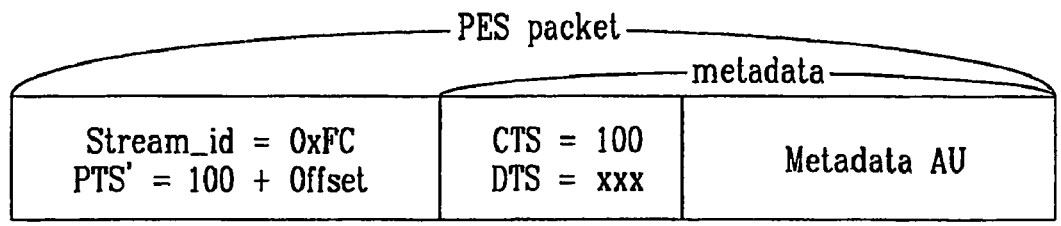
FIG. 6 shows an exemplified PES packet for synchronizing synchronous metadata with MPEG-2 data according to a preferred embodiment of the present invention.

FIG. 6 shows a PES packet format for synchronizing the metadata with the MPEG-2 data.

Since the synchronized metadata is not organically operated, the synchronized metadata can be synchronized with the MPEG-2 data by inputting each CTS time value of the metadata stream through a value identical with that of a PTS time value, which can be expressed as in Equation 4.

$$PTS(t)=CTS(t) \qquad \text{Equation 4}$$

Figure 7:
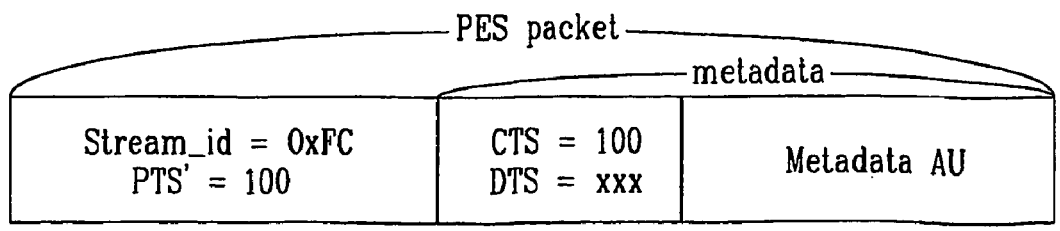
FIG. 7 shows an exemplified PES packet for synchronizing synchronized metadata with MPEG-2 data according to a preferred embodiment of the present invention.

FIG. 7 shows a PES packet format for synchronizing the synchronized metadata with the MPEG-2 data. Through the above process, the synchronous and synchronized metadata can be synchronized with the multimedia contents, and they are packetized into 188-byte TS packets and multiplexed with input MPEG-2 audio/video TS so as to transmit them.

According to the present invention, a detailed implementation method for synchronizing the metadata used as additional information in the digital broadcasting with the MPEG-2 data and transmitting them is provided, thereby enabling transmitting the metadata in real-time, enabling the user's random access, and applying the two kinds of data in various ways.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A metadata transmitter for synchronizing metadata with multimedia content and transmitting the synchronized metadata and multimedia content comprising:
    a multimedia content authoring unit for generating multimedia content;
    a multimedia content format converter for compressing the generated multimedia content, and converting the compressed content into a format suitable for synchronization and transmission;
    a metadata authoring unit for generating metadata describing the multimedia content, the metadata including transmission types and transmission information;
    a metadata format converter for converting the metadata into binary codes, converting the binary codes into a format suitable for synchronization with the multimedia contents and a format suitable for transmission; and
    a multiplexer for multiplexing the converted multimedia contents and the converted binary codes respectively output from the multimedia contents format converter and the metadata format converter into a stream, and outputting the stream.

2. The transmitter of claim 1, wherein the metadata format converter comprises:
    a metadata synchronization format converter for converting the metadata from the metadata authoring unit into said binary codes, and converting said binary codes into said format suitable for synchronization with the multimedia content; and
    a metadata transmission format converter for converting the data output from the metadata synchronization format converter, to said format suitable for transmission.

3. The transmitter of claim 2, wherein the synchronization-format includes a decoding time value and an output time value.

4. The transmitter of claim 3, wherein the decoding time value and the output time value include a time default value and a time reference value of the metadata.

5. The transmitter of claim 2, wherein the metadata synchronization format converter comprises:
    a metadata binary code converter for converting the metadata from the metadata authoring unit into binary codes;
    a metadata synchronous format converter for converting the converted binary codes into a metadata synchronous format including a metadata time default value and a metadata time reference value;
    an MPEG-2 packetizing controller for classifying the metadata output by the metadata synchronous format converter as metadata that have a synchronized time value and metadata that do not have a synchronized time value, packetizing the metadata that have a synchronized time value into packetized elementary stream (PES) packets, packetizing the metadata that do not have a synchronized time value into sections, and generating program specific information (PSI) including metadata transmission types and transmission information;
    a PSI generator for writing the PSI output by the MPEG-2 packetizing controller in a program map table (PMT) section;
    a PES packetizer for packetizing the metadata that require synchronization and are output from the MPEG-2 packetizing controller into PES packets; and
    a section packetizer for packetizing the metadata that do not require synchronization and are output from the MPEG-2 packetizing controller into sections.

6. The transmitter of claim 5, wherein the metadata synchronization format converter further comprises:
    a real time protocol (RTP) packetizer for packetizing the metadata output from the metadata synchronous format converter into an RTP;
    a sync layer (SL) packetizer for packetizing synchronous metadata, synchronized metadata, and asynchronous metadata output from the metadata synchronous format converter into MPEG-4 SLs; and
    a packetizing controller for selecting one of the RTP packetizer, the MPEG-2 packetizing controller, and the SL packetizer, and transmitting the metadata output from the metadata synchronous format converter so as to match a transmission network of the multimedia contents with that of the metadata.

7. The transmitter of claim 5, wherein the time default value used for the metadata synchronous format is obtained by dividing a time reference value that is system time clock (STC) defined by the MPEG-2 system standard by an integer, and the metadata time reference value used for the metadata synchronous format is obtained by dividing a program time reference value that is a program clock reference (PCR) by an integer.

8. The transmitter of claim 5, wherein the PES packetizer extends a stream identifier of a PES packet header defined by the MPEG-2 system standard to packetize the metadata that require synchronization into PES packets.

9. The transmitter of claim 8, wherein the metadata that require synchronization are synchronous metadata, and a presentation time stamp (PTS) used for a format of the PES packet is a value obtained by adding an offset value to a composition time stamp (CTS) of a metadata access unit.

10. The transmitter of claim 8, wherein the metadata that require synchronization are synchronization metadata, and a presentation time stamp (PTS) used for a format of the PES packet is matched with a composition time stamp (CTS) of a metadata access unit.

11. The transmitter of claim 5, wherein the PSI generator extends a stream type of a PMT table header defined by the MPEG-2 system standard so as to notify a terminal of a metadata transmission notice.

12. A method for synchronizing metadata with multimedia content and transmitting the metadata and multimedia content comprising:
    (a) generating metadata describing multimedia content, the metadata including transmission types and transmission information;
    (b) converting the metadata into binary codes, and converting the binary codes into a format suitable for synchronization with the multimedia data, wherein the synchronization format includes a decoding time value and an output time value, wherein the synchronization format includes a decoding time value and an output time value; and (c) converting the converted metadata into a format suitable for transmission.

13. The method of claim 12, further comprising: (d) multiplexing said multimedia content and the metadata suitable for transmission into a stream.

14. The method of claim 12, wherein the decoding time value and the output time value include a time default value and a time reference value of the metadata.

15. The method of claim 12, wherein said converting the metadata into binary codes comprises:
   converting the generated metadata into binary codes;
   converting the binary codes into a metadata synchronous format including a metadata time default value and a metadata time reference value;
   classifying the metadata output from the metadata synchronous format converter into metadata that have a synchronized time value and metadata that do not have a synchronized time value, and program specific information (PSI) including metadata transmission types and transmission information;
   writing the PSI in a program map table (PMT) section;
   packetizing the metadata into packetized elementary stream (PES) packets when the metadata require synchronization; and
   packetizing the metadata into sections when the metadata do not require synchronization.

16. A metadata transmitter for synchronizing metadata with multimedia contents comprising:
   a metadata authoring unit for generating metadata describing the multimedia content, the metadata including transmission types and transmission information;
   a metadata synchronization format converter for converting the metadata into binary codes, and converting the binary codes into a format suitable for synchronization with the multimedia content;
   a metadata transmission format converter for converting data output from the metadata synchronization format converter to a format suitable for transmission; and a multiplexer for multiplexing the multimedia content and the metadata output from the metadata transmission format converter into a stream, and outputting the stream.

17. The transmitter of claim 16, wherein the synchronization format includes a decoding time value and an output time value, and the decoding time value and the output time value include a time default value and a time reference value of the metadata.

18. The transmitter of claim 16, wherein the metadata synchronization format converter comprises:
   a metadata binary code converter for converting the metadata generated by the metadata authoring unit into binary codes;
   a metadata synchronous format converter for converting the converted binary codes into a metadata synchronous format including a metadata time default value and a metadata time reference value;
   an MPEG-2 packetizing controller for classifying the metadata output by the metadata synchronous format converter as metadata that have a synchronized time value and metadata that do not have a synchronized time value, packetizing the metadata that have a synchronized time value into packetized elementary stream (PES) packets, packetizing the metadata that do not have a synchronized time value into sections, and generating program specific information (PSI) including metadata transmission types and transmission information;
   a PSI generator for writing the PSI output by the MPEG-2 packetizing controller in a program map table (PMT) section;
   a PES packetizer for packetizing the metadata that require synchronization and are output from the MPEG-2 packetizing controller into PES packets; and
   a section packetizer for packetizing the metadata that do not require synchronization and are output from the MPEG-2 packetizing controller into sections.

* * * * *